United States Patent [19]
Bishop et al.

[11] Patent Number: 5,700,108
[45] Date of Patent: Dec. 23, 1997

[54] DYNAMIC REEF, METHOD OF USE, AND SHORELINE EROSION CONTROL SYSTEM EMPLOYING SAME

[76] Inventors: Robert J. Bishop; Justin D. Bishop, both of 1083 Bloomfield Ave., West Caldwell, N.J. 07006

[21] Appl. No.: 481,615

[22] Filed: Jun. 7, 1995

[51] Int. Cl.⁶ ................................................. E02B 3/04
[52] U.S. Cl. ........................ 405/26; 405/21; 405/22
[58] Field of Search ........................ 405/22, 24, 31, 405/21, 79, 29–35

[56] References Cited

U.S. PATENT DOCUMENTS

| | | | |
|---|---|---|---|
| 527,513 | 10/1894 | See et al. | 405/22 |
| 1,593,863 | 7/1926 | Brasher | 405/22 |
| 3,373,821 | 3/1968 | Sare | 405/22 X |
| 3,846,990 | 11/1974 | Bowley | 405/31 X |
| 4,407,607 | 10/1983 | McCambridge | 405/22 X |

FOREIGN PATENT DOCUMENTS 805789  12/1958  United Kingdom .................... 405/22

*Primary Examiner*—Dennis L. Taylor
*Attorney, Agent, or Firm*—Weingram & Associates, P.C.

[57] ABSTRACT

A dynamic reef is provided in accordance with the invention. The dynamic reef includes anchoring means for anchoring the reef in a substantially fixed position with respect to a shoreline, an elastic rubber tubing secured to the anchoring means, and at least one flotation collar positioned so as to be rotatable about the rubber tubing for the purpose of dissipating wave energy. A solar strobe unit may be positioned on the rubber tubing at the end opposite the anchoring means and functions as a warning device. A method for preventing shoreline erosion and a system for reducing the effects of waves on a shoreline are also provided in accordance with the invention.

19 Claims, 7 Drawing Sheets

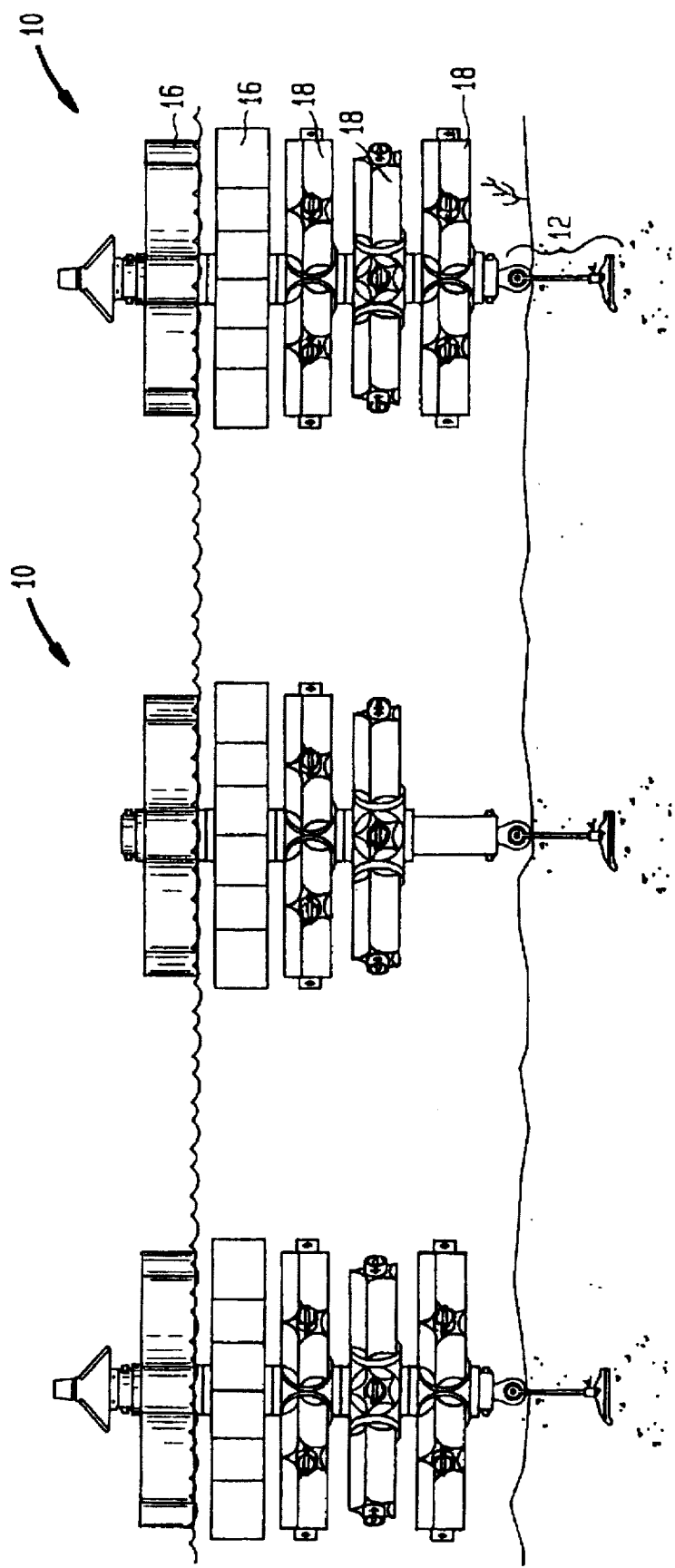

DYNAMIC REEF, METHOD OF USE, AND SHORELINE EROSION CONTROL SYSTEM EMPLOYING SAME

FIELD OF THE INVENTION

This invention relates generally to devices for reducing shoreline erosion caused by the force of waves against beaches, methods for using such devices, and shoreline erosion control systems employing same and in particular, to a dynamic reef, a method of use of the dynamic reef, and a shoreline erosion control system employing a multiplicity of such dynamic reefs.

BACKGROUND OF THE INVENTION

Presently known systems for reducing damage to a shoreline by waves include use of breakwaters such as sea walls, jetties and sand groins, extending on the ocean floor or along the shore to act as barriers to obstruct or deflect the waves. Other systems utilize surface flotation devices spaced along the shoreline in the path of the waves to dissipate energy. These devices are generally extremely costly and inefficient.

Specifically, traditional systems often fail because they are in direct confrontation with the ocean and the erosion and scouring effects render any fixed edifice useless. Such systems can even be detrimental to the beaches that are supposed to be protected.

A shoreline erosion control system including a plurality of rotatable elements, means for holding the elements together, and means for limiting the movement of the means for holding the elements together is disclosed and claimed in a co-pending application of the named inventors herein. In that system, the rotatable elements are hollow spheres having openings for the passage of water therethrough. The movable means include flexible netting enclosing the rotatable elements. Anchoring means secure the ends of the netting to the sea bed to limit movement of the netting and elements. Groups of like systems are intended to be aligned along an extended shoreline area and can cover a significant distance.

It would, therefore, be desirable to provide a dynamic reef and a system for reducing damage to a short distance along a shoreline that is relatively inexpensive and efficient.

It is a goal of the invention to provide a unique reef and system for reducing the effects of waves on a shoreline.

It is another goal of the invention to minimize erosion of a shoreline by efficiently dissipating wave energy.

It is a further goal of the invention is to provide a dynamic reef having at least one flotation collar rotatable about a defined axis.

It is yet another goal of the invention is to provide a dynamic reef anchored with respect to a shoreline and having a multiplicity of flotation collars rotatable about a defined axis for dissipating wave energy.

It is yet a further goal of the invention is to provide a shoreline erosion control system employing a plurality of dynamic reefs positioned in a staggered configuration with respect to each other and to a shoreline.

Further goals and advantages of the invention will in part be obvious and will in part be apparent from the following description and the scope of the invention will be defined in the claims.

SUMMARY OF THE INVENTION

Generally speaking, a dynamic reef is provided in accordance with the invention. The dynamic reef includes anchoring means for anchoring the reef in a substantially fixed position with respect to a shoreline, an elastic member, such as elastic or rubber tubing, or an elastic rod element having similar resilient properties secured to the anchoring means, and at least one flotation collar positioned so as to be rotatable about the tubing for the purpose of dissipating wave energy. A solar strobe unit may be positioned on the tubing at the end opposite the anchoring means and functions as a warning device. A method for preventing shoreline erosion using the dynamic reef and a system for reducing the effects of waves on a shoreline are also provided in accordance with the invention.

The invention accordingly comprises an article of manufacture possessing the features, properties and the relation of elements and a method including the several steps and the relation of one or more of such steps with respect to each of the others which will be exemplified in the article and method hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
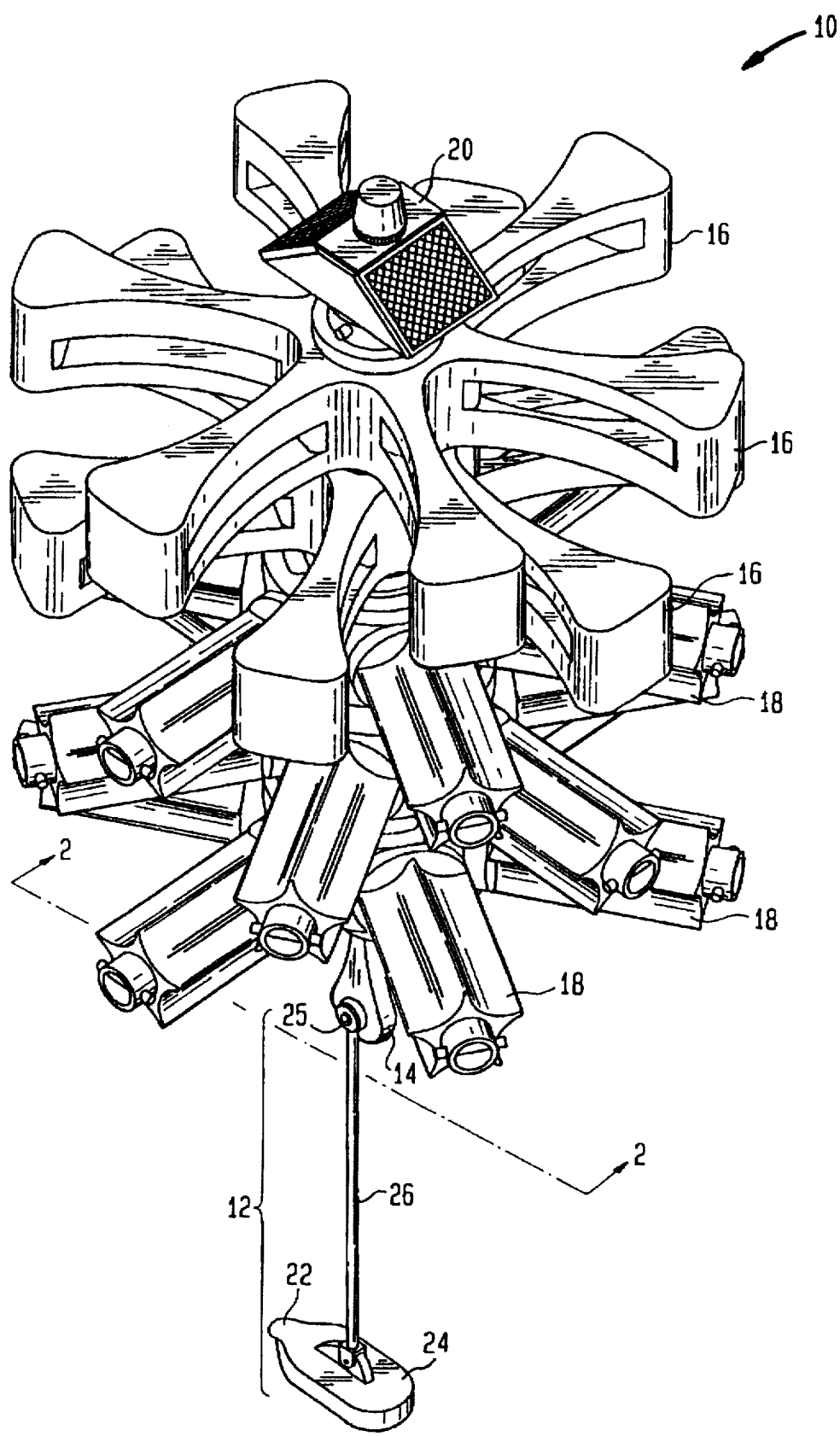
FIG. 1 is a perspective view of a dynamic reef constructed and arranged in accordance with a preferred embodiment of the invention.
Figure 2:
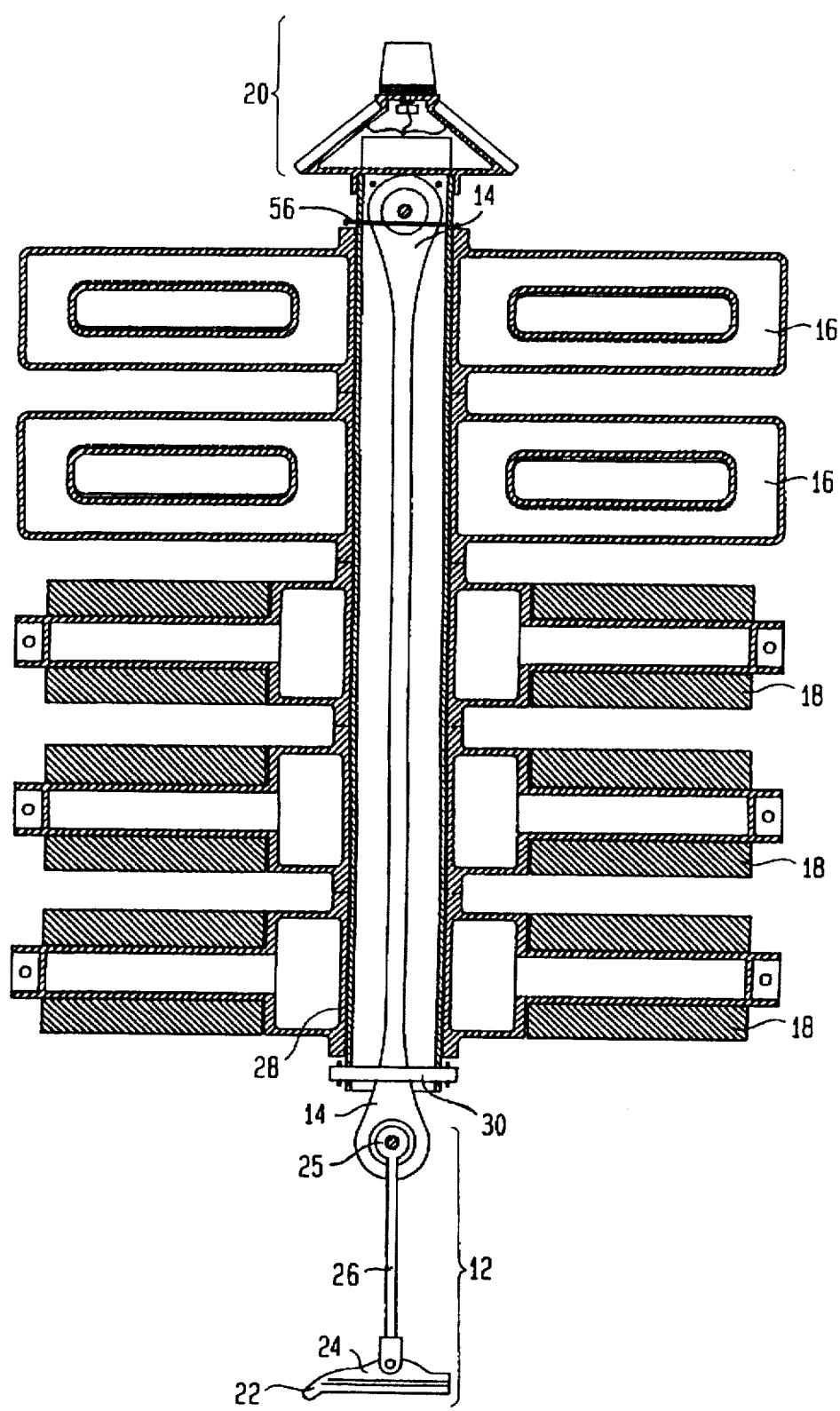
FIG. 2 is a cross section of a dynamic reef taken through section arrow 2 of FIG. 1.

A dynamic reef 10 constructed and arranged in accordance with a preferred embodiment of the invention is shown generally in FIGS. 1 and 2. The dynamic reef 10 includes an anchor 12, elastic tubing 14 and a solar strobe unit 20. A multiplicity of first flotation collars 16 and second flotation collars 18 are arranged so as to be rotatable about the elastic tubing 14.

The anchor 12 may be of any type designed to be driven into the earth or surface under a body of water. In a preferred embodiment, the anchor 12 is a MANTA RAY® marine anchor system available from Foresight Products, Inc. of Traverse City, Mich.

MANTA RAY® anchors are constructed of galvanized nodular ductal iron. A tip or drive point 22 of the anchor 12 resembles a star drill with wings attached to the body, an attaching clevis for an anchor rod, and a drive gad receptacle in the body 24. A screw anchor rod 26 is secured to the detaching clevis.

The anchor 12 can be driven to a desired depth using hand-held breakers, i.e. pneumatic jack hammers, or hydraulic equipment. The anchor 12 is then proof loaded to a desired holding capacity using a load locking device or dynamometer. Holding capacity is dependent on such factors as soil type, depth of installation, the size of the anchor, and the load that is being anchored.

In the case of a dynamic reef 10, the anchor 12 is secured to an elastic tubing 14. Suitable elastic tubing are available from Hazelerr Corporation of Colchester, Vt.

A Hazelett elastic tubing employs a unique elastic, high-strength material that can stretch up to four times its unloaded length. It has excellent abrasion resistance and can tolerate twisting. In addition, elastic tubing 14 uses rigid polyurethane thimbles to accept shackle pins and thereby eliminate all metal-to-metal contact.

The elastic tubing 14 absorbs periodic wave forces and stretches as the wind increases, thus decreasing its scope angle. The decreased scope angle increases the holding power of the anchor 12. Furthermore, marine growth is easily dislodged by the stretching elastic tubing 14.

A hollow tube 28 having openings at each end is fitted over the elastic tubing 14. The tube is preferably formed of a plastic material and has a diameter of between about 6 and 10 inches, preferably about 8 inches and a length of between about 6 and 8 feet, preferably about 7 feet. A first shackle pin 30 is positioned through the tube 28 and the elastic tubing 14 for the purpose of locking the hollow tube 28 in position with respect to the tubing 14.

Figure 3:
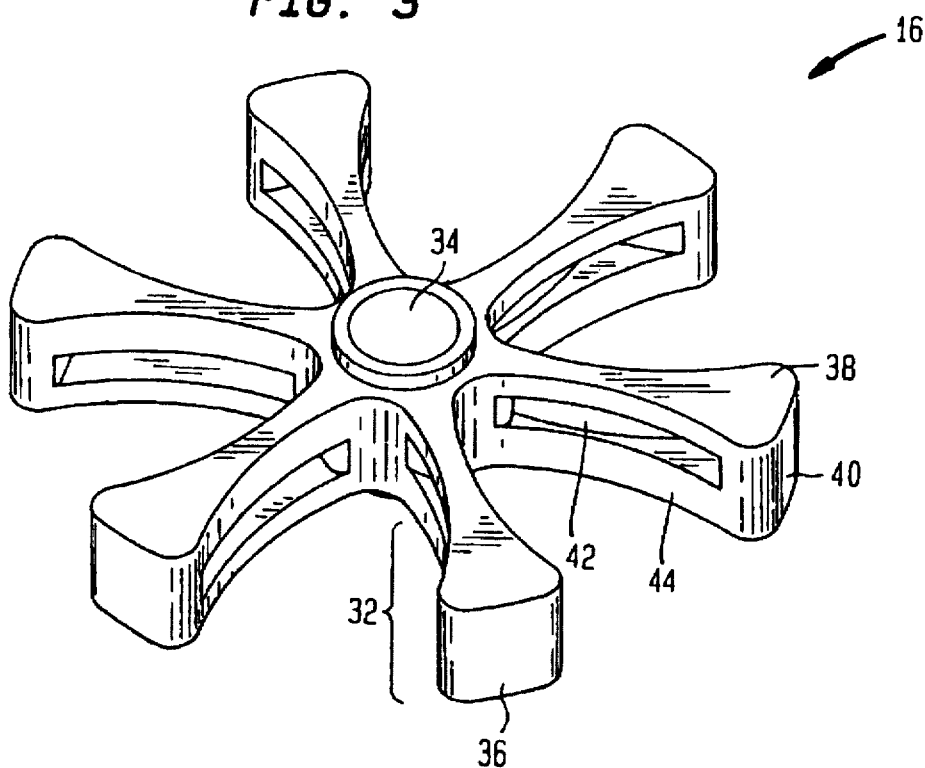
FIG. 3 is a perspective view of a first flotation collar constructed and arranged in accordance with a preferred embodiment of the invention.
Figure 4:
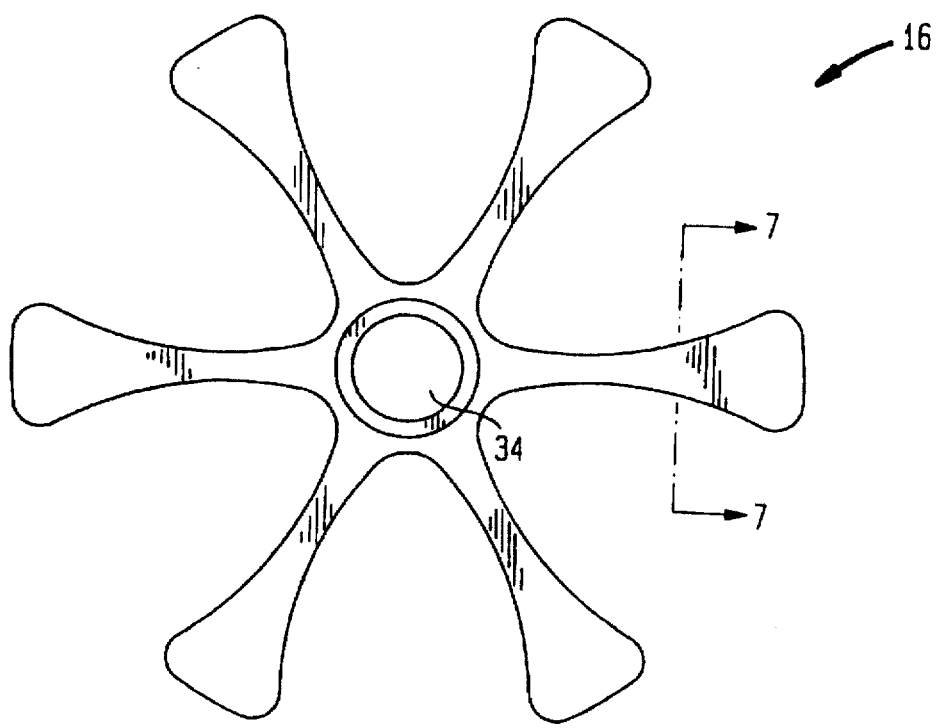
FIG. 4 is a top plan view of the flotation collar of FIG. 3.

A first flotation collar 16 adapted to be positioned along the hollow tube 28 so as to rotate about an axis defined by the elastic tubing 14 is shown in perspective in FIG. 3 and in top plan view in FIG. 4. The first flotation collar 16 includes a plurality of blades 32, preferably between about 5 and 7 blades 32 and more preferably, 6 blades 32. Each blade 32 is between about 5 feet and 7 feet, preferably about 6 feet measured from a center point 34 of the hollow tube 28 to an outermost surface 36. Each blade 32 has a concave shape along its length as can readily be seen in FIG. 4.

Each blade 32 has a depth of between about 9 inches and 15 inches, preferably about 12 inches measured between an upper surface 38 and a bottom surface 40. In addition, each blade 32 includes a horizontal slot 42 extending between each concave surface 44. The slot 42 also extends for a significant portion of the length and depth of each blade 32.

Figure 7:
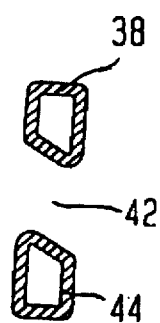
FIG. 7 is a cross section of a first flotation collar taken along section arrow 7 of FIG. 4.

A cross section of a blade 32 is depicted in FIG. 7. In a preferred embodiment, the slot 42 is angled with respect to the blade 32.

Figure 5:
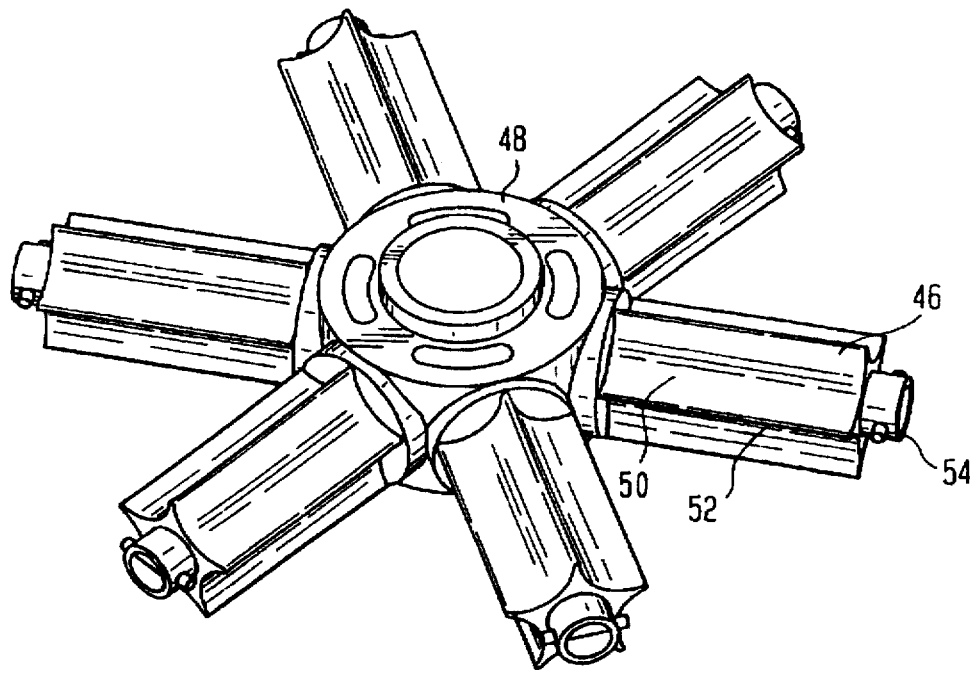
FIG. 5 is a perspective view of a second flotation collar constructed and arranged in accordance with a preferred embodiment of the invention.
Figure 6:
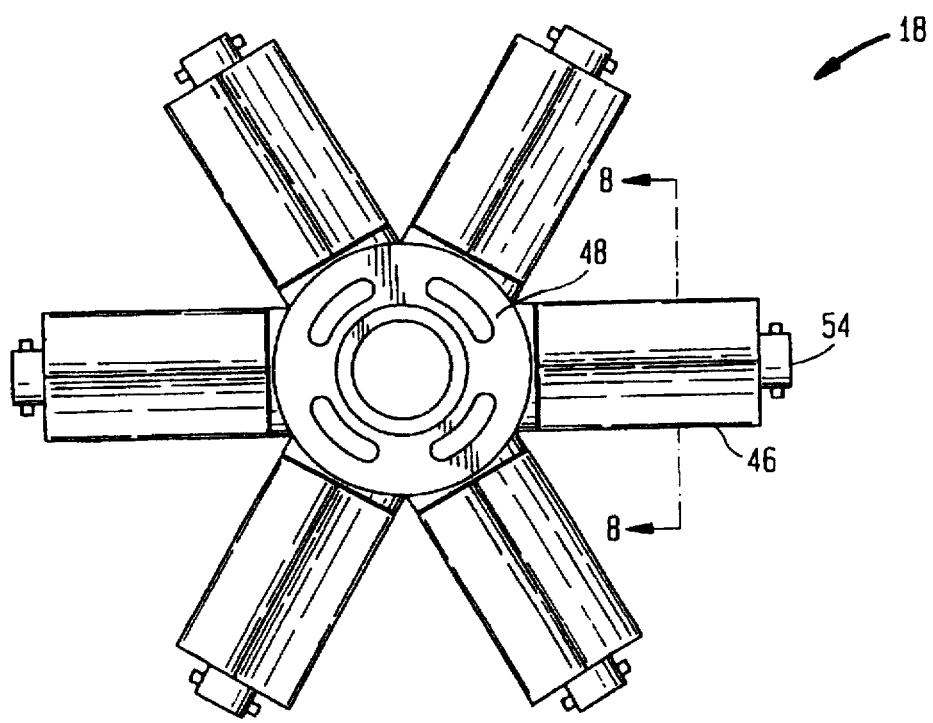
FIG. 6 is a top plan view of the flotation collar of FIG. 5.
Figure 8:
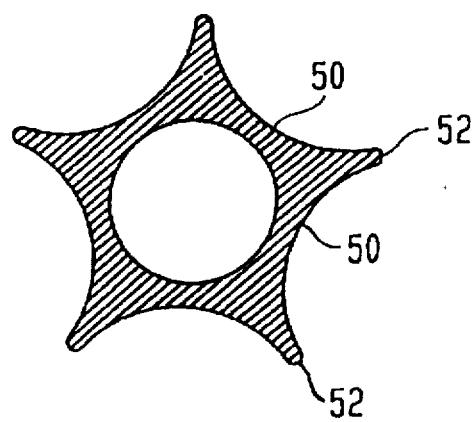
FIG. 8 is a cross section of a second flotation collar taken along section arrow 8 of FIG. 6.
Figure 9:
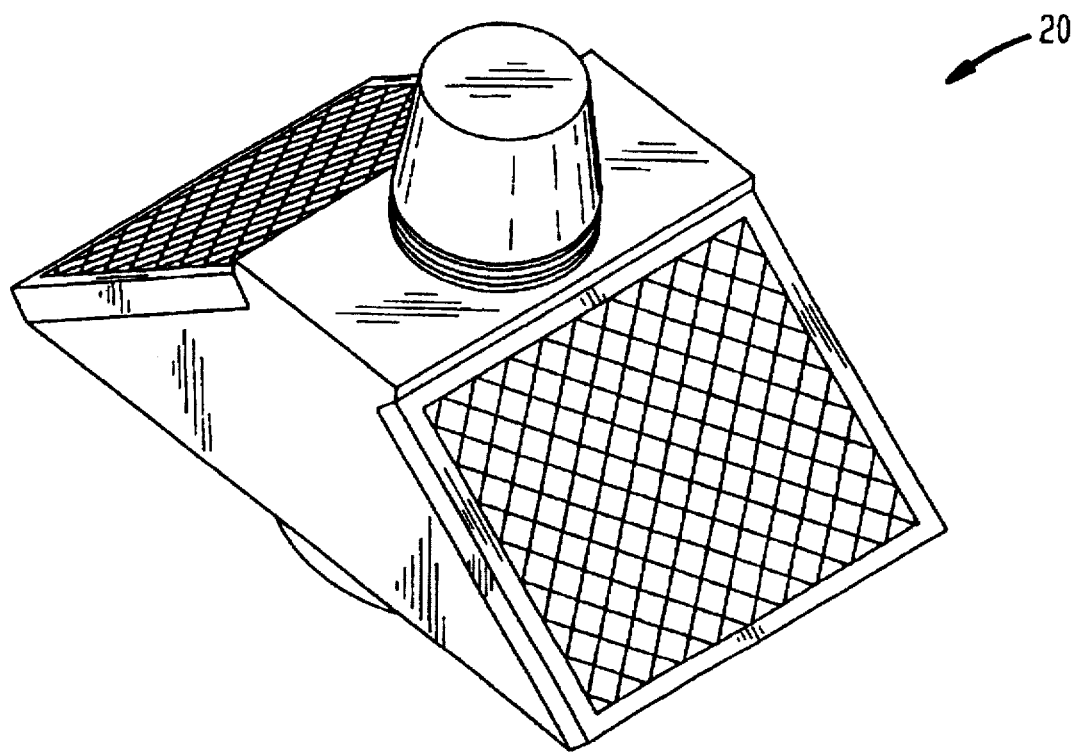
FIG. 9 is a perspective view of a solar strobe unit for use on a dynamic reef constructed and arranged in accordance with a preferred embodiment of the invention.

A second type of flotation collar 18 is shown in perspective in FIG. 5 and in top plan view in FIG. 6. Second flotation collar 18 includes between about 5 and 7 paddles 46, preferably about 6 paddles 46 positioned about a ring 48 of the collar 18. Each paddle 46 has a substantially star-shaped configuration with concave edges 50 between the points 52 as shown in cross-section in FIG. 8. Each paddle 46 is rotatable about a horizontal axis extending from the center point 34 of hollow tube 28 to an outermost edge 54 of the paddle 46.

A plurality of flotation collars 16 and 18 are arranged along the hollow tube 28 and secured by a second shackle pin 56. Although the precise number and configuration of the flotation collars 16 and 18 can be changed, a dynamic reef 10 having three collars 18 and two collars 16 of a first type is shown. However, it is understood that the invention is not limited to this configuration.

A solar strobe unit 20 may be positioned above the hollow tube 28 and secured to the elastic tubing 14 at the end opposite the anchor 12.

In use, the anchor 12 of the dynamic reef 10 is sunk into the ocean floor to a depth of between about 6 feet and 8 feet, preferably about 7 feet so that only an attaching device 25 such as a ring bolt is exposed above the ocean floor. The dynamic reef 10 includes one or more first flotation collars 16 and/or one or more second flotation collars 18. Each flotation collar 16 and 18 is separately rotatable about the hollow tube 28 and accordingly, about the elastic tubing 14.

With respect to the first flotation collars 16, the concave shape of the blades 32 turns the water upon itself so as to reduce the wave energy and provide wave dissipation. The horizontal slot 42 in each blade aids in the reduction of lift on the structure and creates turbulence in the water, thereby providing increasing wave reduction. As each blade turns in its circular motion, dissipation is increased and the waves striking the blades 32 create a vortex effect. The vortex effect traps sand which is being carried away by erosive waves so that the sand is deposited around the dynamic reef 10.

The star-shaped paddles 46 also rotate horizontally as well as on the vertical axis provided by the elastic tubing 14. Each horizontal star-shaped paddle 46 moves independently and creates additional vortexes which aid in wave dissipation. The combination of the first flotation collars 16 and the second flotation collars 18 on the same dynamic reef 10 achieve increased dynamic results.

The solar strobe units 20 are positioned on the dynamic reef 10 to serve as a warning device.

Figure 10:
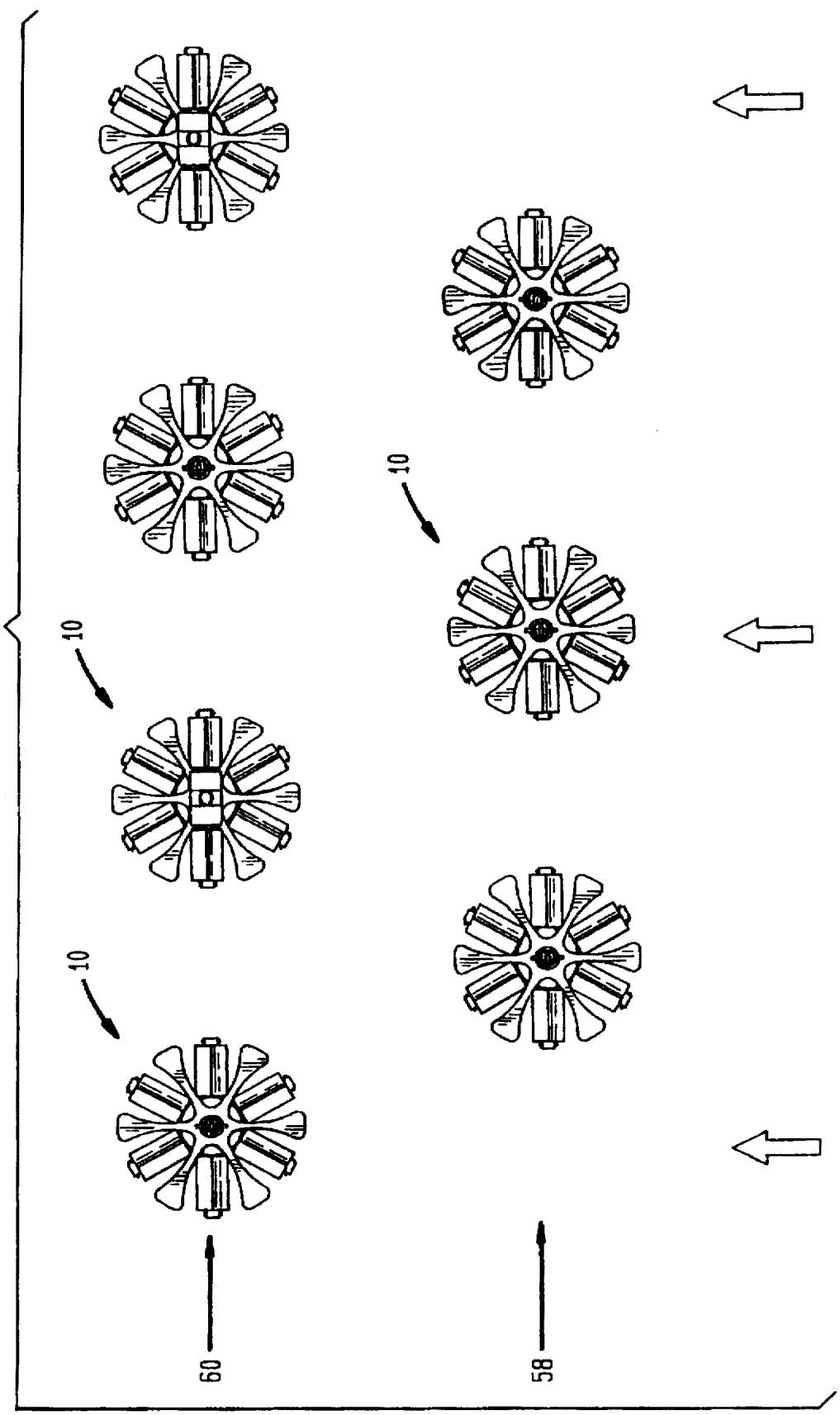
FIG. 10 is a top plan view of a system for controlling shoreline erosion using a multiplicity of dynamic reefs constructed and arranged in accordance with the invention; and, FIG. 11 is a side plan view of a system for controlling shoreline erosion using a multiplicity of dynamic reefs constructed and arranged in accordance with the invention.

In use, a multiplicity of dynamic reefs 10 are arranged in an offset configuration as depicted in FIGS. 10 and 11. This permits dynamic reefs 10 in a second line 60 to cover gaps in a first line 58. The dynamic reefs 10 are preferably offset a distance of between about 4 and 6 feet, preferably about 5 feet apart in all directions.

The dynamic reefs, method of use, and system for controlling erosion provided in accordance with the invention is designed to function through wave height reduction and interference with near bottom currents. The system is designed to withstand hurricane-strength conditions and each reef will move in any direction. When struck by waves, the buoyancy of each reef permits it to return to its original position. The dynamic reefs, method of use and system are useful as wave attenuators for applications such as harbor and marina protection as well as coastal construction sites. Furthermore, the present invention is portable and as the shoreline increases and sand bars develop around the dynamic reef system, the complete system can be moved to a location further out to sea. It is also possible to use multiple lines of dynamic reefs to create a greater depth of defense.

It will thus be seen that the objects set forth above, among those made apparent from the preceding description are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention described and all statements of the scope of the invention which, as a matter of language, might be said to fall therebetween.

What is claimed is:

1. A dynamic reef comprising:

an elongated elastic member; and a plurality of flotation collars rotatable about the elastic member, each rotation collar adapted for independent movement with respect to the elastic member and other of the plurality of flotation collars, the plurality of flotation collars coacting during independent movement to dissipate wave energy.

2. The dynamic reef according to claim 1, further comprising:

anchoring means connecting the elastic member to a surface beneath the dynamic reef.

3. The dynamic reef according to claim 2, wherein the anchoring means comprises:

a body portion secured to the surface beneath the dynamic reef; and a rod having a first end connected to the body portion and a second end connected to the elastic member.

4. The dynamic reef according to claim 1, further comprising:

a tube having an open-ended bore extending therethrough sized and shaped to receive the elastic member such that the tube extends between the elastic member and the plurality of flotation collars, and securing means for securing the tube to the elastic member.

5. The dynamic reef according to claim 4, wherein the tube is formed from plastic.

6. The dynamic reef according to claim 5, wherein each one of the plurality of flotation collars comprises:

a hub portion constructed and arranged to extend about the tube; and a plurality of blades extending outward from the hub portion.

7. The dynamic reef according to claim 6, wherein each one of the plurality of blades comprises:

a concave surface area.

8. The dynamic reef according to claim 6, wherein each one of the plurality of blades comprises:

a horizontal slot extending through each blade.

9. The dynamic reef according to claim 1, further comprising:

at least one paddle element having an elongated rotatable member mounted to extend from a corresponding one of the plurality of flotation collars, the elongated rotatable member independently rotatable about an axis substantially transverse to a longitudinal axis of the elastic member.

10. The dynamic reef according to claim 9, wherein the elongated rotatable member has a plurality of concave surface areas extending substantially parallel to the axis of the elongated rotatable member, and a transition edge interconnecting adjacent concave surface areas such that a cross section of the at least one paddle element resembles a star-shape.

11. The dynamic reef according to claim 1, further comprising:

light means mounted to an end of the elastic member.

12. The dynamic reef according to claim 11, wherein the light means comprises:

a solar-powered strobe light.

13. A method of dissipating energy in waves to reduce shoreline erosion, the method comprising the steps of:

positioning a plurality of flotation collars about an axis of an elongated elastic member in a path of the waves;

subjecting the plurality of flotation collars to wave action; and rotating each one of the plurality of flotation collars independently of each other and the elastic member upon impact of the waves against the plurality of flotation collars for the flotation collars to coact with each other when rotating;

wherein turbulence and vortices are provided within the wave action to dissipate energy from the waves.

14. The method according to claim 13, further comprising the step of:

guiding portions of the waves through at least one of the plurality of flotation collars to reduce lift of the plurality of flotation collars in the waves.

15. A system for dissipating energy from waves approaching a shoreline, the system comprising;

a plurality of dynamic reefs, each one of the plurality of dynamic reefs comprising:

an elongated elastic member; and a plurality of flotation collars rotatable about the elastic member, each flotation collar adapted for independent movement with respect to the elastic member and other of the plurality of flotation collars, the plurality of flotation collars coacting to dissipate wave energy;

the plurality of dynamic reefs being arranged in an offset configuration with respect to the shoreline to maximize an amount of energy extracted from the waves.

16. The system according to claim 15, wherein the offset configuration of the dynamic reefs comprises:

a first line of dynamic reefs; and a second line of dynamic reefs;

wherein the first and second lines of dynamic reefs are offset with respect to each other in order to maximize an area of contact with the waves and extract energy therefrom.

17. A dynamic reef comprising:

elastic tubing;

a plurality of flotation collars independently rotatable about the elastic tubing;

a plastic tube sized and shaped to fit over the elastic tubing and be disposed between the elastic tubing and the plurality of flotation collars;

securing means for securing the plastic tube to the elastic tubing;

a hub portion extending about the plastic tube; and a plurality of blades extending outward from the hub portion;

wherein the plurality of flotation collars coact to dissipate wave energy.

18. The dynamic reef according to claim 6, wherein each one of the plurality of blades comprises:

at least one concave surface area extending along each one of the plurality of blades.

19. The dynamic reef according to claim 17, wherein each one of the plurality of blades comprises:

a horizontal slot extending through each blade.

* * * * *